Jan. 24, 1967  R. W. FULTON  3,300,713
MULTI-PURPOSE IGNITION TEST UNIT
Filed July 5, 1963  3 Sheets-Sheet 2
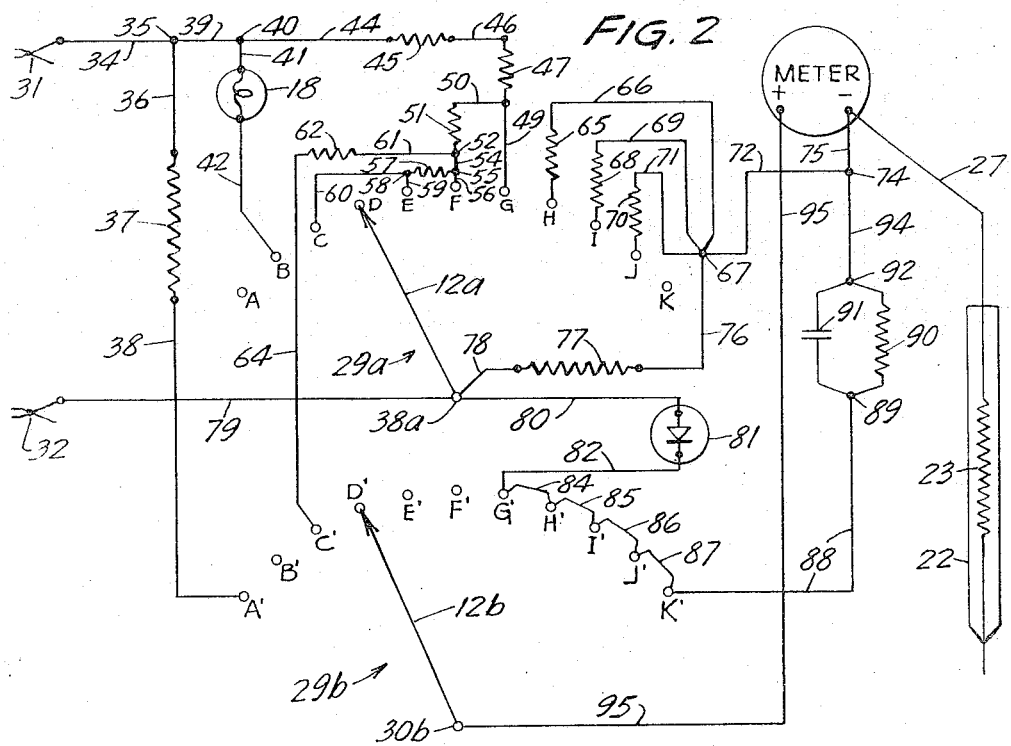
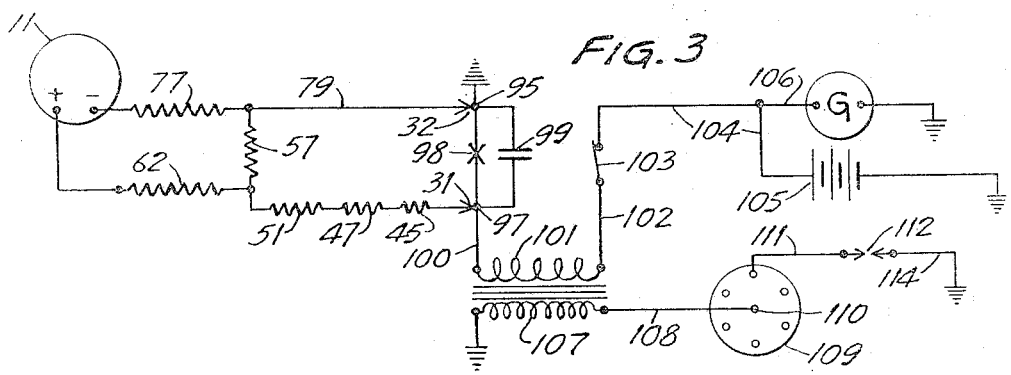
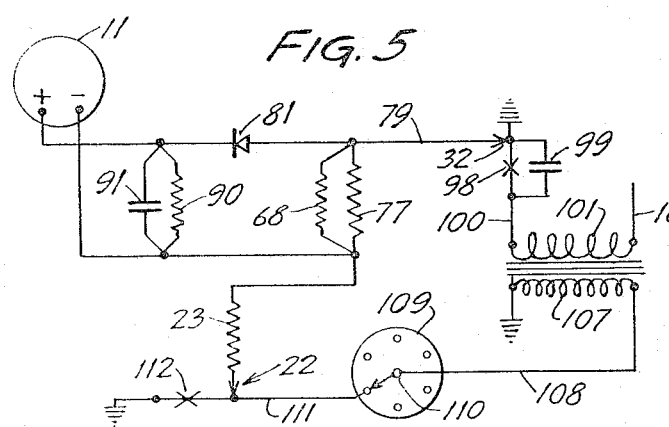
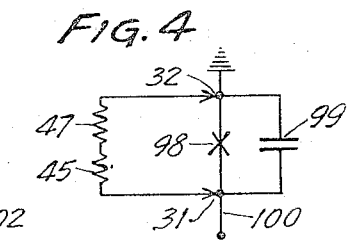
INVENTOR
ROBERT W. FULTON
BY Moore, White & Burd
ATTORNEYS

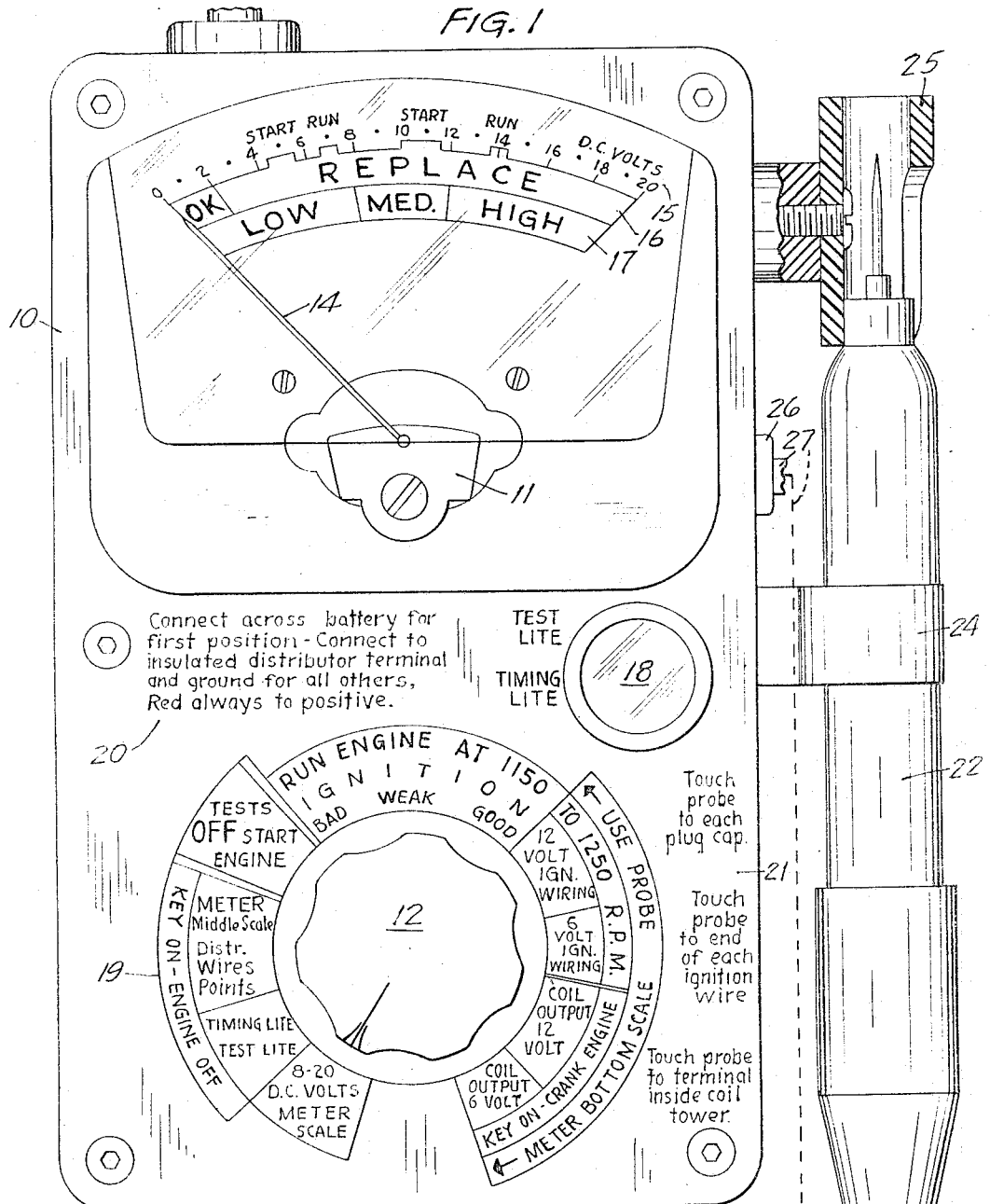

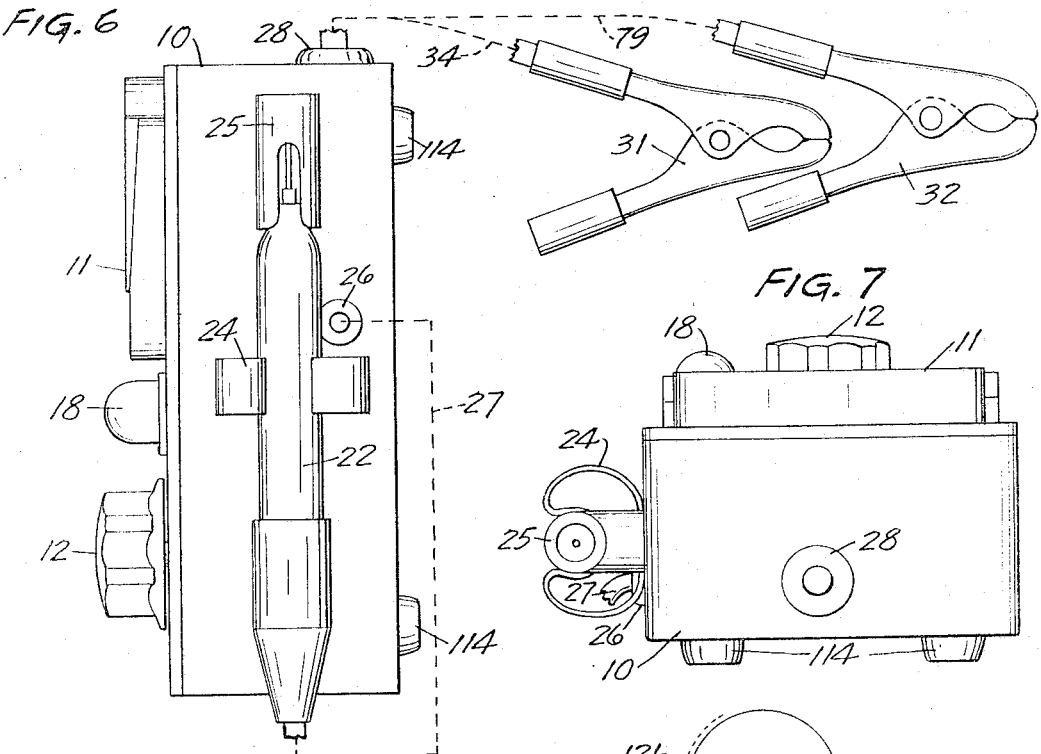

United States Patent Office 3,300,713
Patented Jan. 24, 1967

3,300,713
MULTI-PURPOSE IGNITION TEST UNIT
Robert W. Fulton, 4428 Zane Ave. N.,
Minneapolis, Minn. 55422
Filed July 5, 1963, Ser. No. 293,090
4 Claims. (Cl. 324—16)

This invention is an instrument for trouble shooting automotive and similar electrical circuits and is particularly useful in checking the efficiency of and isolating problems in battery-generator powered ignition systems. A portion of the novelty of the meter resides in having within a single hand portable case means for checking the efficiency of the entire ignition system and for checking individual portions of the igniton system to isolate malfunctioning units. Novelty also resides in the arrangement of the single test control knob and instructions which relieves the user of any need to comprehend the system being tested beyond recognizing units. Additional novelty is alleged for the structural combination which makes possible a single control or switch for the device whereby it is possible to have basic instructions for operating the device contained directly on the case thereof.

It is further novel to provide an instrument of this nature in which by following a pattern of checks laid out with the single selector switch on the face of the instrument, a systematic check of the ignition system may be carried out.

Until now test devices for checking automotive and similar battery generated ignition systems tended to be extremely elaborate and, furthermore, required considerable knowledge on the part of personnel operating them in order to obtain useful information.

Without exception they contained elaborate switching and control mechanism which were difficult for mechanics to learn to use unless they understood precisely the work they were doing. In many cases automotive mechanics systems are not this edcuated as to what actually takes place in the ignition system when it operates. As a result, only the most skillful of these people are able to solve other than run of the mill problems. In most instances, electrical trouble shooting degenerates into simply removing and replacing units until an improved operation is observed. Even skillful personnel sometimes needed considerable time to trouble shoot automotive ignition systems before they were able to determine precisely what difficulties exist.

Accordingly, it is the principal object of this invention to provide a novel electrical test instrument.

It is a further object of this invention to provide an ignition system testing device which establishes a checking pattern for relatively unskilled technicians.

Yet another object of this invention is to provide an instrument of such simple operation that the main instructions for using it may be printed directly on the face of the instrument.

A still further object of this invention is to provide an electrical system testing device which will discover and isolate difficulties much more quickly and precisely than previously known devices and one which requires less knowledge of its user.

Yet another object of this invention is to provide an ignition system testing device which is highly portable.

It is another object of this invention to provide a test instrument for both the high and low voltage portions of battery generator powered ignition systems.

It is a still further object of this invention to provide an instrument that is protected against damage resulting from improper connections.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 1 is a top plan view of the instrument with portions broken away to illustrate constructions more fully;

FIGURE 2 is a wiring diagram for one form of device;

FIGURE 3 is a wiring diagram for a simple battery generator ignition system shown in light lines with a simplified circuit diagram connected thereto illustrating an ignition primary check made by the instrument of this invention;

FIGURE 4 is a fragmentary view of the ignition system wiring diagram of FIGURE 3 with a simplified diagram of a circuit of the present invention connected thereto illustrating one form of system ignition check made by this device;

FIGURE 5 is a fragmentary view of the ignition diagram of FIGURE 3 with a simplified diagram of a circuit of this invention connected thereto illustrating a test for a high voltage;

FIGURE 6 is a side elevation of the device shown in FIGURE 1 in a smaller scale with portions deleted to conserve space;

FIGURE 7 is an end elevation of the device shown in FIGURES 1 and 6 and drawn to the scale of FIGURE 6; and FIGURE 8 is a wiring diagram of the modified form of the circuit shown in FIGURE 2.

Referring to the drawings and specifically to FIGURE 1, the instrument is contained in any suitable case 10 the upper portion of which contains a meter mechanism 11 and the lower portion of which contains the circuitry controlled by a single gang switch, the knob of which appears at 12 in FIGURE 1.

The meter is provided with the usual needle 14, but three different scales appear on its face. One at 15 is calibrated in volts from zero to 20, but this scale is marked particularly to show the proper voltages for both 6 and 12 volt automotive battery generator systems when starting and when running the engine. At 16 is shown a scale indicating that the item being checked is either okay or needs replacement and a third scale at 17 is divided into high, medium and low. Thus when using any scale on the meter face, the mechanic is directly instructed whether the item being checked is satisfactory or not. He need have no real knowledge of how the system is supposed to operate in order to use this test device successfully.

A test light may be incorporated in the unit as shown at 18 which is covered with a suitable red jewel cover that both protects the bulb and makes the light easy to see whether illuminated by 6 volt energy or 12 volt energy.

On the lower face of the instrument case is arranged at 19 a series of instructions for placing control knob 12. These instructions show the various positions the knob 12 should be placed in for various tests. At 20 are shown instructions for connecting the low voltage test leads described and shown in more detail in connection with FIGURE 6. At 21 may be seen instructions for connection of the high voltage test probe 22.

For reasons explained below, probe 22 is provided with internal resistance described below. The high voltage test probe is conveniently started by the clip 24 and the head socket 25 secured to the side of the case 10 in any conventional manner as shown. At 26 is seen a grommet through which the lead 27 extends to connect the test probe to the internal circuitry. At 28 is a similar grommet that provides for entrance and exit of the leads to the low voltage test connection to be described in more detail later.

Meter 11 is a zero to 100 micro ampere ammeter which accordingly is very sensitive. It is appropriately protected against excessive current flow by suitable resistors connected in series with it and described below in connection with FIGURE 2 to which reference is now made.

In FIGURE 2 the meter is seen symbolically and again assigned the number 11 consistent with FIGURE 1. The timing light is designated 18 also as in FIGURE 1. Probe 22 appears symbolically as do internal resistance 23 and its lead 27 connecting it to the negative terminal of the meter. In ganged switches 29a and 29b the arrow contacts are designated 12a and 12b to indicate that they are connected to and actuated simultaneously by knob 12. As knob 12 is turned, various connections are made from the center terminal or main switch contact 30a for the upper of the ganged switches 30b for the lower of the ganged switches to the various other contacts. Actually, of course, switch 29 is a somewhat different mechanical structure but conventional and not further described; electrically it functions as shown in the diagram. The upper one of the ganged switches has its terminals labelled A through K consecutively and the lower ganged switch 29b is similarly marked A' through K' consecutively. The contact arms are shown positioned at D–D' which is the "off" position to which terminals nothing is connected.

For low voltage work, there are two so-called alligator clip connections, one designated 31 which is the positive connection and 32 the negative connection. Positive clip 31 is connected by a lead 34 to a juncture point 35 and from there by a lead 36 to a resistance 37 which is a very great one, in the particular circuitry shown, 196,000 ohms. A lead 38 connects resistance 37 to terminal A'.

A lead 39 connects terminal 35 to a second junction 40 which in turn is connected by a lead 41 to timing light 18. Another lead 42 connects the other terminal of timing light bulb 18 to terminal B in the upper ganged switch 29a. Junction point 40 is also connected by a lead 44 to a resistor 45 that has a low value, in this circuit 1½ ohms, which is connected by a lead 46 to another resistor 47, having a value of 2 ohms, in series with resistor 45. The other end of resistor 47 is junction point 48. A lead 49 connects junction point 48 to terminal G.

A lead 50 interconnects resistor 51, of 7 ohms resistance, and junction point 48. The other end of resistor 51 is junction point 52. Lead 54 interconnects junction point 52 with junction point 55 while a lead 56 connects junction point 55 to switch terminal F. Resistor 51 has the value of 7½ ohms.

The resistor 57, of 15 ohms value, is interconnected between junction points 55 and 58. A lead 59 interconnects the junction point 58 with switch terminal E. Lead 60 connects junction point 58 with switch terminal C.

Also connected to junction point 52 is a lead 61 which connects to a resistor 62, the other end of which is connected by a lead 64 to switch terminal C'. Resistor 62 is a high resistance unit, in this case 1500 ohms.

Resistances 37 and 62 are so-called 5% resistors which means that their resistance is as nominally stated plus or minus 5%. Resistances 45, 47, 51 and 57 are all resistances of 1% tolerance which means that they have their nominal resistance plus or minus 1%.

Switch terminal H is connected to a resistor 65 which is a 100 ohm, 5% error resistor that is also connected by a lead 66 to a junction point 67. Switch terminal I has connected to it a resistor 68 which is a 200 ohm 5% error resistor connected by a lead 69 to junction point 67. Switch terminal J is connected to a resistor 70 which is a 51 ohm 5% error unit. This resistor is connected by a lead 71 to junction point 67. Switch terminal K is disconnected from the system so that switch arm 12a makes no connected with the circuit in position K. Junction point 67 is connected by a lead 72 to a junction point 74 which in turn is connected by a lead 75 to the negative terminal of meter 11. From junction point 67 also a lead 76 connects to a resistor 77 that is a 1500 ohm 5% error unit. A lead 78 interconnects the other end of this resistor with switch terminal 30a. Negative clip 32 is connected by a lead 79 to the central switch terminal 30a also.

Lead 80 interconnects terminal 30a with a rectifier or diode 81 which permits current flow only in one direction to avoid negative meter readings. A lead 82 connects the other terminal of unit 81 to switch terminal G'.

A series of jumper leads 84–87 interconnect the switch terminal G' through K' consecutively. From K' a lead 88 extends to a junction point 89. This junction point is connected to a resistor and condenser in parallel, the resistor being designated 90 and the condenser 91. The resistor is 1000 ohm 5% error unit while the condenser is a 250 microfarads, 25 working volts, direct current unit. These two units are also connected to a junction point 92 which in turn is connected by a lead 94 to junction point 74. The plus terminal of meter 11 is connected by a lead 95 to the terminal 30b of the switch 29b.

In FIGURE 3, there is illustrated so much of the structure as is used when switches 29a and 29b are turned to the position C–C' and connected across the points of the primary circuit of the battery generator powered ignition system. As will be seen, meter 11 is connected via resistors 62 and 77 to opposite ends of resistor 57. The latter is connected in series with the resistors 51, 47 and 45.

The resistors are connected to ground 96 and to the insulated side 97 of ignition points 98. The usual condenser 99 is connected in parallel with the points. A lead 100 interconnects the ignition points with the primary coil winding 101 which in turn is connected by lead 102 to the switch 103 and via lead 104 to the battery 105 and generator 106, which latter two are connected in parallel, of course.

At 107, the secondary ignition coil is seen connected by a high tension lead 108 to the distributor 109, the rotor 110 of which is shown connected to one of the high tension leads 111 leading to a spark plug 112 which of course is grounded as at 114 by being screwed into the engine.

The test made at this time is made with ignition switch 103 closed as shown but with the engine not running. Points 98 are also closed. The test unit provides a parallel path for current to flow around points 98 through a known resistance and meter 11 measures the voltage drop across resistor 57. Since the total resistance of resistors 45, 47, 51 and 57 is about 39 ohms nominally, plus or minus 1%, and the resistors 62 and 77 total 3000 ohms plus or minus 1%, the meter 11 should give a reading but a very slight one. Very little if any current will flow through this series of resistors assuming that ignition contact points are in good condition. If they are badly pitted, misaligned or otherwise offer any appreciable resistance to the passage of current, however, a larger quantity of current will flow through the resistors 45, 47, 51 and 57 which will produce a voltage drop across resistor 57 that shows on meter 11. Of course some current will always flow through resistor 57 and meter 11, being a very sensitive one, will measure it. However, if current is so small that the voltage drop is insufficient to cause the needle 14 of meter 11 to move out of the area in scale 16 marked "OK," then the point structure is considered to be in acceptable condition. However, if the current flow through resistor 57 is sufficient to move the needle over into the area in scale 16 labelled "REPLACE," then the resistance of points 98 is such that they need to be repaired or replaced. Lead 100 may be checked for good continuity by moving clip 31 from the distributor housing to the terminal of coil 101 to which lead 100 is connected. The needle should remain in the "OK" area of scale 16. In a similar manner, all circuit points between coil 101 and ground may be checked with the points closed. Whether the points are closed or not is checked easily by position B–B' with the clips 31 and 32 connected as shown in FIGURE 3. When the points are closed, light 18 will be out. Stated another way, the system is not ready for check C–C' until light 18 is out.

The circuit shown in simplified schematic form in FIGURE 3 may be traced out on FIGURE 2 by visualizing that the arms 12a and 12b pointing to contacts C and C' and then beginning with either clip and tracing through the circuit. In FIGURE 3, the generator system is represented symbolically simply as a circle marked with G and none of the obviously necessary control system and the like are shown. It is no part of this invention, and is well known to anyone familiar with battery generator powered ignition systems.

In FIGURE 4 is illustrated a fragment of the ignition system shown in FIGURE 3 wherein the points 98 are shown connected to the ground and to the lead 100 that connects the points to the primary coil. The condenser 99 also appears. The portion of the circuit of the testing device of this invention is also shown. It is quite simple and consists of the resistors 47 and 45 connected in series with each other and in parallel to the points 98. In this test the engine is started with the switch arms 12a and 12b in the position illustrated in FIGURE 1, that is to say in the "off" position. Thereafter, the switches are turned successively to terminals E–E', F–F' and G–G', the last of which is illustrated in FIGURE 4. In each of these positions, a gradually decreasing resistance is connected in parallel to the points. In so doing, a continuing path for current is supplied around the points when they open. When this resistance is rather high, that is to say, when it is the sum of resistances 57, 51, 47 and 45 as is true when the switch is located at E–E', current attempting to continue after the points open meets with a relatively high resistance, and the primary field created by the primary coil winding tends to collapse relatively rapidly, thereby inducing voltage reasonably well in secondary winding 107. As the resistance of this parallel circuit gets lower and lower, however, the ease with which current continues to flow around points 98 increases until position G–G' is reached. At this point, there is a total of only 17 nominal ohms providing a secondary circuit around points 98. In this test position, unless the ignition system is functioning rather well, this secondary path of the current will retard the collapse of the primary coil magnetic field to such an extent that insufficient voltage will be generated at coil 107 to continue supplying voltage across spark gap 112.

Referring again briefly to FIGURE 1, the positions E–E' through G–G' are those in the instructions 19 designated "BAD," "WEAK" and "GOOD." If the engine continues to run smoothly when in the position G–G' which is marked "GOOD," it means that sufficient spark will be generated to cause the engine to function smoothly even under rather difficult conditions as when the engine is loaded suddenly in attempting to accelerate while going up hill or suddenly from low speed into high gear. If the engine fails to operate in any of these positions, the ignition system cannot be relied upon to function under stress although the engine may appear to operate satisfactorily when little demand is made.

The test circuit for the secondary voltage requirements is shown in simplified illustrated form in FIGURE 5. In that figure, a fragment of the ignition system is shown including points 98 and condenser 99 together with the primary coil 101 and lead 100 interconnected to primary coil and the points. Lead 102 is also shown but the switch 103 and the battery generator system is deleted to conserve space. Also shown is the secondary winding 107 the distributor 109 and the spark plug 112 together with the interconnecting leads, etc. To make the test in this instance, the clip 32 remains connected as for previous tests and so may the clip 31 although it is not material in the form of the device shown in FIGURE 2. The switch terminals used during the test of the high voltage system are those from H–H' through K–K' inclusive. The actual circuit illustrated in FIGURE 5 is position I–I' wherein the probe 22 and its resistor 23 are connected in series with resistors 68 and 77 that are in parallel with each other, and they are in turn connected to the ignition system between the ground and the insulated or "hot" side of the spark plug. This test will demonstrate whether adequate voltage is being presented to this particular plug. Each plug lead is checked in turn to see if it is provided with adequate power at its insulated terminal. Lead 111 should also be disconnected and checked as shown except for its connection to plug 112. Probe 22 may be moved back along the circuits at various points for high voltage output if the output at the plug end of lead 111 is unsatisfactory. Condition of the plugs is checked only by the process of elimination.

In the position shown, the probe is applied at the insulated terminal of spark plug 112, clip 32 to ground. This connection provides a circuit connected in parallel to the plug through the probe and the parallel resistors 68 and 77 thence through lead 79 and clip 32 to ground. As spark plug 112 is fired, there is a current flow through this circuit as well as across the spark gap. As current flows through the circuit including the probe and the resistances 68 and 77, there is of course a voltage drop measured across these parallel resistors. This appears on meter 11 as a reading, which if the system is satisfactory, will be in the areas marked "MEDIUM" or preferably "HIGH" on the scale 17.

It is desirable, of course, to have the system operating well enough to move the needle to the "HIGH" portion of scale 17. If a "LOW" reading is obtained with lead 111 connected, it should be rechecked while disconnected. If a "LOW" reading is still obtained, the probe should be moved back to the distributor, etc. until a higher reading is achieved. If all tests are at least satisfactory, but the engine still does not perform, the spark plugs are fouled, improperly gapped, or shorted out if the trouble lies in the ignition system.

Coiled resistor 90 and the condenser 91 act as an electrical surge chamber to damp out the tail end fluctuations of voltage to minimize needle fluctuation as this reading is taken. The result is a wavering but more or less steady reading of the meter. Current flow through the resistors of course is intermittent as the spark plug is fired which accounts for the wavering character of the reading. However, the sparks come so relatively close together that the meter does not have the time physically to return to zero and hence a relatively steady reading is recorded on the instrument.

Position I–I' which is illustrated in FIGURE 5, is the one marked "6 Volt Ignition Wiring" on the instruction surrounding knob 12 in FIGURE 1. The 12 volt system is checked at position H–H' and in this position of knob 12, resistor 65 is substituted for resistor 68, the circuit otherwise remaining the same. The only effect is to reduce the parallel resistance which requires a greater current flow in order to produce a given voltage drop. The effect of this is to make the meter read approximately the same for an efficient 12 volt system as it does for an efficient 6 volt system.

In checking with the wire 108 disconnected, however, the meter should be shifted to the positions J–J' for 12 volt systems and K–K' for 6 volt systems. The reason for this is that with lead 108 disconnected from the distributor or the coil 107, the engine will not operate, of course, and hence the possible voltage to be measured is reduced. When wire 108 is disconnected, the system is operating only by cranking the engine with the battery. The altered circuit leaves desirable readings on scale 17 the same for these high voltage tests as for others.

It will be noted that rectifier or diode 81 is connected into the meter circuit to prevent current from being passed in the wrong direction through the meter to protect it against such high voltages tending to force needle 14 off scale to the left as viewed in FIGURE 1. When the meter is incorrectly hooked up, there is simply no reading on the meter regardless of where probe 22 is placed.

In FIGURE 6, the structure is shown in side elevation in substantially full size. At the left, which would be the top of case 10, will be seen the meter 11, the light 18 and the knob 12 for the gang switch 29. On the side are clearly shown clip 24 and cap 25 holding the probe 22 to the case when not in use. The broken line represents lead 27 connecting the probe to the interior working of the case through grommet 26. The reason for using the broken line in this instance, is that the lead for probe 22 is actually very long in order to make it easy to place the meter on the fender or some other convenient location on the car and still reach all of the points of the ignition system. Clips 31 and 32 are shown substantially full size together with their leads 34 and 79. They are seen entering case 10 through grommet 28.

It is desirable to have rubber feet as shown at 114 by means of which the device may be placed on a polished car body without danger of marking it and to minimize the likelihood that the device may slip off.

In FIGURE 7 the device may be seen in end elevation, and again meter 11, light dome 18 and knob 12 may be seen in part at least. Also cap 25 and clip 24 show clearly as does a fragment of lead 27 extending up to its grommet 26. Grommet 28 is also shown.

The modified form of the invention shown in FIGURE 8 is very similar in many respects to the device illustrated in FIGURE 2. The low tension clips 31A and 32A are equivalent to the clips 31 and 32 and similarly for every number followed by the small letter *a* are identical to the part bearing a corresponding number in FIGURE 2. The terminals in the gang switch 29*a* have been designated by the capital letters A through K followed by the exponent 2 in the case of the upper unit and the exponent 3 in the case of the lower unit. The two switch contact arms controlled by the knob on the outside of the case have been designated 12*c* and 12*d* to indicate that they are different from each other but substantially identical to the arms 12*a* and 12*b* in FIGURE 2. In place of resistors 45, 47, 51, and 57, however, this structure employs inductance coils designated 115, 116, 117 and 118.

The theory of operation of these inductance coils is that as they are connected in various combinations with the condenser in an automobile ignition system, they produce a circuit of varying degrees of approach to resonance. Since circuits of varying approaches to resonance offer a variety of resistance to current flow, they hence offer a variably resisting alternate path for current in parallel with the ignition system points. As the path for current through the test device is made better and better, operation of the system is made more and more difficult. In the position G2–G3, only a very efficient ignition system will continue to fire the spark plugs regularly and hence an ignition system that is tuned to operate with the switch in the position G2–G3, with leads 31*a* and 32*a* connected comparably to clips 31 and 32 in FIGURE 3, would be one that was in very good condition. Another variation in FIGURE 8 from that illustrated in FIGURE 2 is a lead 120 which connects to shielding 121 arranged with respect to the meter.

Further modifications reside in the manner in which the probe 22*a* is connected in the rest of the circuit. Instead of being connected directly to the negative terminal meter, it is connected instead to one contact of a condenser 122 which in turn connects to a junction point 124. Junction point 124 is connected to the negative terminal of the meter 11*a* by a dual path; one extending through a resistor 125 and the other via the rectifier 81*a*, the resistance 126 and the variable resistor or rheostat 127. This type of structure makes it possible to calibrate the meter a little more effectively and thereby produce perhaps somewhat greater consistency from unit to unit. As a practical matter, however, the structure illustrated in FIGURE 2 is adequate for most automotive work.

From the foregoing description of this testing device, it should be apparent that even a relatively unskilled operator, if he can identify the various units that make up the ignition system of an automobile, can use this meter by simply following the procedure outlined in the panels surrounding control knob 12. In the first knob position, the condition of the battery is checked both without load and then under load and finally the voltage determined by the voltage regulator is checked. Thereafter, the position of the points is easily determined with light 18 in the second position.

It is possible with this unit to check the timing of an engine but this does require a little more skill than any of the other checks involved. It is possible to position the distributor by turning the engine so that it is ready to fire number one cylinder and then to back the engine off until the test light goes out and proceed to then move the engine forward slowly usually mechanically as with a crank or by prying on the flywheel until such time as the light barely comes on. At this point the timing marks on the engine are examined, and if the spark is too slow or too early the distributor is adjusted until the points exactly open on the timing mark. This procedure is the standard one, always employed in timing an engine, however, and is not particularly novel with this device.

The principal novelty of light 18 in this device is simply to provide a very quick and obvious means to make sure that the system is in the proper position for the check C–C′ with the structure shown in FIGURE 2 and that is to say with the points closed and the ignition turned on. Thereafter, the knob is turned to position 3 and the meter tells immediately that the point structure is carrying current well or needs to be worked on. When clip 31 or 32, as the case may be depending on whether the system being checked is a positive or negative ground system, is moved back to the coil the condition of the primary coil lead to the points is checked out. Likewise, the distributor cap may be removed and connections within the distributor checked, one after the other to determine what is causing a high reading if one is obtained.

The knob 12 is then moved to the position marked "off" or position D–D′ on diagram, FIGURE 2, and the engine started. Following this, the switch is moved consecutively to the primary circuit loading positions to see if the system as a whole is efficient or not. Of course, if the engine runs in tthe position G–G′, there is no point in further checking the ignition system.

The engine will not continue to operate in the position G–G′, however, and further checks in the position H–H′ through K–K′ are indicated. Clearly, a very systematic and thorough check of the ignition system can be made by anyone having even a minimum of knowledge of an automotive ignition system, and the difficulty located with precision and consistency.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A battery generator ignition test device comprising: a case, a meter works secured in said case and having a dial face bearing at least three distinct scales thereon, ganged switches in said case spaced from said meter, a single knob operating said ganged switches, a plurality of electrical units interconnected with and by said ganged switches in various relationships with said meter works, a pair of clip leads interconnected with said ganged switches and said electrical units, said clip leads being distinctively marked, a test probe connected to said meter works and one of said clips via said ganged switches and combinations of said electrical units, said ganged switches having a plurality of positions to which they can be turned by the knob and at least three of which cause said clips to be interconnected by different resistances in distinct steps, said case having instructions thereon adjacent to said knob in which instructions said three positions are labelled to indicate three different grades of efficiency, and at least one other position of said knob interconnecting said clips with a fixed resistance and connecting said meter works across said fixed resistance, said one other knob position being labelled on said case to indicate a particular one of said scales as significant when said knob is in said one other position, and at least two additional positions of said knob arranging said ganged switches to interrconnect one of said clips and said test probe via one of two predetermined resistances selectively across which said meter works is connected, said two additional positions of said knob being labelled on the face of said case indicating two different tests of high voltage and designating the third of said meter scales only as significant when said knob is in either of said two additional positions.

2. The structure of claim 1 in which said meter scales are: a volt meter scale, a scale having a small portion marked "OK" and a large portion marked "REPLACE" and a scale divided into approximately three equal parts indicating three degrees of efficiency such as low, medium and high.

3. The structure of claim 1 in which said three positions interconnect said clips by resistances within the range 15 to 45 ohms.

4. The structure of claim 1 in which any circuit including said meter includes a means for allowing current flow in only one direction.

References Cited by the Examiner
UNITED STATES PATENTS

| | | | |
|---|---|---|---|
| Re. 22,470 | 4/1944 | Heyer | 324—29.5 |
| 2,352,499 | 6/1944 | Sears | 324—73 X |
| 2,430,069 | 11/1947 | Mesh | 324—16 |
| 2,535,279 | 12/1950 | Folk | 324—115 X |
| 2,675,522 | 4/1954 | Godshalk | 324—29.5 |
| 2,712,634 | 7/1955 | Briner | 324—15 X |
| 2,732,491 | 1/1956 | Jeannot | 324—115 X |
| 2,938,161 | 5/1960 | Schafer | 324—15 |
| 3,028,543 | 4/1962 | Parmater et al. | 324—115 X |
| 3,058,062 | 10/1962 | Parmater et al. | 324—115 X |
| 3,155,804 | 11/1964 | Weissert | 324—15 |

RUDOLPH V. ROLINEC, *Primary Examiner.*

WALTER L. CARLSON, *Examiner.*

A. E. RICHMOND, *Assistant Examiner.*